UNITED STATES PATENT OFFICE.

JOB MORTEN AUGUST STILLESEN, OF NIAGARA FALLS CENTRE, ONTARIO, CANADA.

PREPARATION OF LIME NITROGEN.

982,311.  Specification of Letters Patent.  Patented Jan. 24, 1911.

No Drawing.  Application filed May 1, 1909.  Serial No. 493,261.

*To all whom it may concern:*

Be it known that I, JOB MORTEN AUGUST STILLESEN, a subject of the King of Norway, residing at Niagara Falls Centre, in the Province of Ontario and Dominion of Canada, have invented certain new and useful improvements in Preparation of Lime Nitrogen, of which the following is a full, clear, and exact specification.

This invention relates to preparation of lime nitrogen, and more particularly has reference to improvements whereby a more neutral product may be obtained than has heretofore been known.

It has been proposed to form nitrogen compounds by passing nitrogen through heated calcium carbid which commonly contains free lime (CaO), sometimes as much as 15%, and the resulting lime nitrogen will contain this free lime as an impurity. For use in fertilizers, the free lime may be objectionable and has a bad effect on some soils, since the compound is too strongly alkaline. I have discovered that this objection can be remedied by treating the lime containing material with carbon dioxid at a temperature such as to cause the lime to combine and form the more neutral carbonate.

This invention therefore has for its objects to provide a process whereby the aforesaid results may be obtained, and the resulting product, as will be more particularly described.

As heretofore proposed, commercial calcium carbid has been treated with nitrogen, with or without a flux, according to the typical reaction.

$$CaC_2 + 2N = CaNCN + C$$

the fluxes, if used, being unchanged, but promoting the reaction and rendering the product non-hygroscopic. Whatever lime the carbid contains, which is usually about 15%, is unchanged by the treatment with nitrogen, and according to this invention, I propose to treat such carbid, or the resultant lime nitrogen containing lime, with carbon dioxid, at a temperature less than the combination of carbon and oxygen, whereby the strongly alkaline lime (CaO) will be, in whole or in part, converted to the more nearly neutral carbonate (CaCO), and thereby remedy the objection heretofore present in the alkaline product. The reaction between carbid and nitrogen takes place at about 1000° C., and I have discovered that, after the nitrogen reaction is completed and the product cooled to below 100° C., the lime can be changed to the more neutral carbonate by admitting a sufficient quantity of carbon dioxid gas to the furnace in intimate relation therewith. This takes place according to the reaction $$CaO + CO_2 = CaCO_3.$$

Also, the carbid containing lime may be first similarly treated, at the proper temperature, and then with nitrogen at the proper temperature, to secure lime nitrogen, this being within the scope of my invention. If any lime should be formed in the nitrogen furnace by decomposition of the carbid, it could be neutralized by subsequent treatment, or neglected.

If a flux be used to promote the combination with nitrogen and obtain a greater yield such as a mixture of calcium fluorid and cryolite, the reaction might be exemplified by the equation $$CaC_2 + CaO + 2N + [CaFl_2 + 3NaFl + AlFl_3] = \\ CaNCN + CaO + C + [CaFl_2 + 3NaFl + AlFl_3].$$

This product can then be treated first with carbon dioxid at about 100° C. to remove the free carbon by oxidation to carbon monoxid $(C + CO_2 = 2CO)$ and then at about 60° C. with carbon dioxid to change the lime to carbonate.

It will therefore be seen that my invention comprehends the change of lime to carbonate either in carbid or in lime nitrogen, with or without a flux, or with or without free carbon. Preferably, I first produce lime nitrogen from carbid and nitrogen with the assistance of a flux and heat, eliminate the free carbon therefrom by oxidation, and then neutralize the free lime by further treatment with carbon dioxid at a lower temperature. Thereby a new product is obtained comprising lime nitrogen and lime carbonate, containing a larger percentage of combined nitrogen than has heretofore been obtained and less alkaline in reaction, depending upon the proportion of free carbon eliminated and the proportion of lime neutralized.

The process can be carried out in any suitable furnace having provision for heating, supplying and controlling the materials employed. The materials used will be obtained in any suitable manner not necessary to be specifically described herein, and of course the proportions of materials may be varied without departing from the scope of the invention.

What I claim as new and desire to secure by Letters Patent of the United States is:

1. The process of rendering alkaline lime nitrogen neutral consisting in forming a carbonate from the alkaline portion by treatment with carbon dioxid.

2. The process of neutralizing lime in lime nitrogen manufacture consisting in converting the lime to carbonate by treatment with carbon dioxid.

3. The process of neutralizing uncombined lime in lime nitrogen consisting in treating the lime nitrogen with carbon dioxid at a temperature that will form calcium carbonate with free lime.

4. The process of preparing lime nitrogen consisting in treating carbid of calcium with nitrogen at an elevated temperature, and then with carbon dioxid at a temperature such as to form calcium carbonate with free lime.

5. A process of preparing lime nitrogen consisting in treating carbid of calcium with nitrogen at an elevated temperature, eliminating free carbon therefrom, and then neutralizing the free lime.

6. The process of preparing lime nitrogen consisting in treating carbid of calcium containing lime with nitrogen at an elevated temperature in the presence of a flux, and then neutralizing the lime by treatment with carbon dioxid.

7. The process of preparing lime nitrogen consisting in treating carbid of calcium containing lime with nitrogen at an elevated temperature in the presence of a flux, and then treating said product with carbon dioxid at a temperature such as to convert the lime to carbonate.

8. The process of preparing lime nitrogen consisting in treating carbid of calcium with nitrogen at an elevated temperature, then while at approximately the same temperature with carbon dioxid, and then at a lower temperature with additional carbon dioxid.

9. The process of preparing lime nitrogen consisting in treating carbid of calcium with nitrogen at an elevated temperature, and then at a temperature below that of formation of carbon monoxid with carbon dioxid.

10. A process of preparing lime nitrogen consisting in treating carbid of calcium with nitrogen at an elevated temperature, then with carbon dioxid at a lower temperature so as to convert free lime into carbonate of lime.

11. A process of preparing lime nitrogen consisting in treating carbid of calcium with nitrogen at an elevated temperature in the presence of a flux, then treating said product with carbon dioxid at a lower temperature so as to convert free lime into carbonate of lime.

12. A process of preparing lime nitrogen consisting in treating carbid of calcium with nitrogen at an elevated temperature in the presence of a flux comprising calcium fluorid, then treating said product with carbon dioxid at a lower temperature so as to convert free lime into carbonate of lime.

13. A composition of matter comprising calcium cyanamid, calcium carbonate, and a flux comprising a fluorin compound.

In testimony whereof I affix my signature, in presence of two witnesses.

JOB MORTEN AUGUST STILLESEN.

Witnesses:
HARRY MARSEY,
E. MAYNARD WHEELER.